March 13, 1934.    S. S. LEAF    1,950,734
FOOD PRODUCT
Filed May 28, 1930    2 Sheets-Sheet 1

Inventor:
Sol S. Leaf
By Williams, Bradbury, McCaleb & Hinkle
Attys.

March 13, 1934.  S. S. LEAF  1,950,734
FOOD PRODUCT
Filed May 28, 1930  2 Sheets-Sheet 2
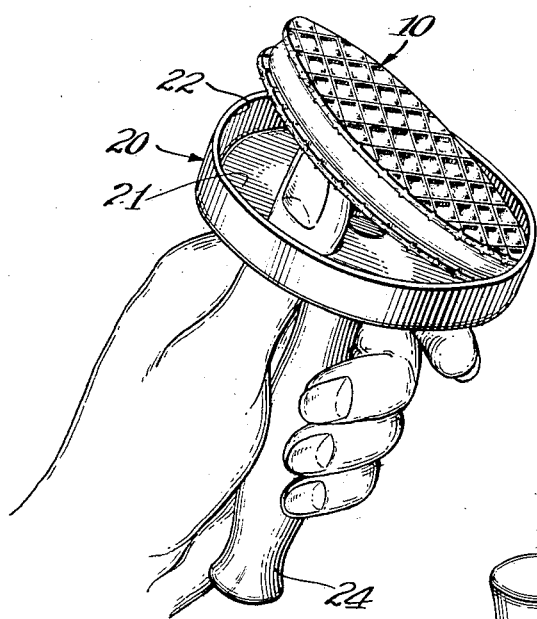
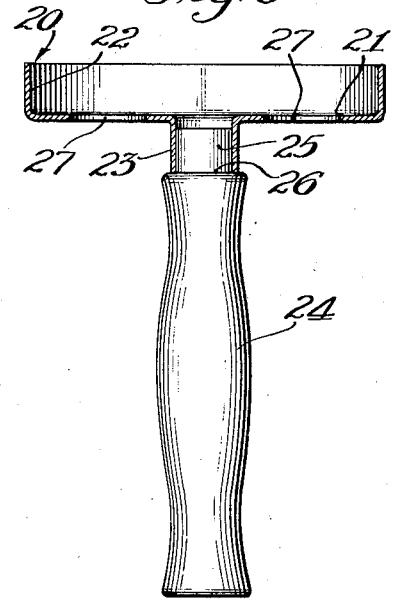
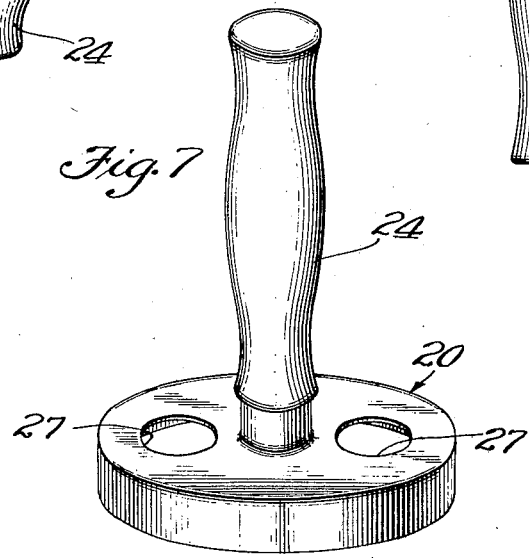
Inventor:
Sol S. Leaf
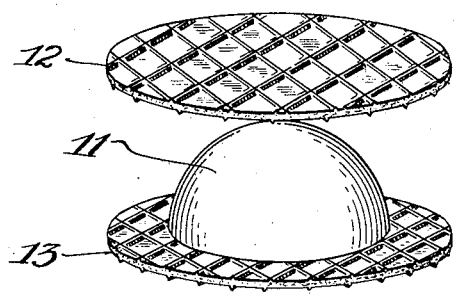

Patented Mar. 13, 1934

1,950,734

UNITED STATES PATENT OFFICE 1,950,734

FOOD PRODUCT

Sol S. Leaf, Chicago, Ill., assignor to Overland Candy Corporation, Chicago, Ill., a corporation of Illinois Application May 28, 1930, Serial No. 456,603

1 Claim. (Cl. 99—16)

The present invention relates to food products, processes and apparatus, and is particularly concerned with ice cream sandwiches, wafers, processes and apparatus used in the manufacture of such sandwiches.

While the present wafer is peculiarly adapted for the manufacture of ice cream sandwiches, it should be understood that the wafer itself is capable of other uses, and I do not limit myself to its use with ice cream, except as set forth in the appended claim.

The embodiment which has been selected to illustrate the invention, consists of an ice cream sandwich, but the wafers may also be used with ices, sherbets, frozen custards, confectionery icing, chocolate icing, candy, sugar wafer filler, bon bon cream, caramel, nougat, etc., and the terms "food filler" or "confection" are used throughout the present specification and claim as generic terms, including all products of similar characteristics capable of cooperating with the wafers in the manner described herein, or which it may be desirable to combine with wafers as disclosed in this application.

One of the objects of the present invention is the provision of an improved ice cream sandwich and wafer for making such sandwiches, which is more convenient, more economical and more salable than the sandwiches of the prior art.

Another object is the provision of an improved ice cream sandwich of a novel shape for this commodity, which is more economical of ice cream and batter than the sandwiches of the prior art, yet which presents a substantial size and a more desirable structure which renders the sandwich more satisfactory to the purchaser.

Another object is the provision of an improved ice cream sandwich and wafer for making such sandwiches, by means of which the wafers are fastened more securely to the ice cream to form a unitary product which is less apt to break, separate or disintegrate while the sandwich is being eaten or handled.

Another object is the provision of an improved ice cream sandwich and wafer, by means of which the dripping of the melting ice cream from the interior of the sandwich is prevented for a reasonable length of time, thereby rendering the sandwich capable of convenient handling while it is being eaten, and rendering the sandwich more sanitary than the products of the prior art.

Another object is the provision of an improved wafer structure for ice cream sandwiches, which is more economical in the use of batter, but which possesses greater strength than the wafers of the prior art, although less material may be used, and although the wafer may be made more crispy than the prior wafers.

Another object is the provision of an improved wafer which may be used with fillers or confections of all kinds, such as ice cream, ices, sherbets, frozen custards, confectionery icing, chocolate icing, candy, sugar wafer filler, bon bon cream, caramel, nougat, etc.

Another object is the provision of an improved method of manufacture of wafers, by means of which a product of more perfect shape and appearance, may be manufactured in large quantities with a minimum expenditure of time and labor.

Another object is the provision of an improved wafer structure and method, by means of which the wafers may be made more crispy on account of the better heat distribution accomplished in baking, and a wafer which may be baked more quickly, and with less trouble in the matter of sticking to the molds.

Another object is the provision of an improved wafer structure which is peculiarly adapted to be used with a batter having more sugar, on account of the better distribution of the batter in the baking operation.

Another object is the provision of a stronger, yet lighter, wafer which is easier to make and/or transport without breakage, and which actually results in only a very small amount of breakage.

Another object is the provision of an improved wafer and sandwich, the shape of which has a peculiar appeal to children by virtue of the facility provided for enjoyable consumption of the filler by licking and/or nibbling, thereby prolonging the enjoyment of the confection as long as possible.

Another object is the provision of an improved wafer which is adapted to be used with any standard coating or depositing machine, or with a hand dip or natural spread for placing a layer or coating of confection or filler of any kind on or about the wafer, to form a novel confection of improved characteristics.

Another object is the provision of an improved ice cream sandwich wafer, process of making sandwiches and a mold peculiarly adapted to be used with any modern ice cream disher in making an improved ice cream sandwich.

Another object is the provision of an improved and simplified mold for making ice cream sandwiches, and improved methods of manipulating the mold and ingredients in forming a more perfect and desirable product more expeditiously, so that an operator can serve a greater number of customers satisfactorily.

Another object is the provision of an improved method of forming ice cream sandwiches, which results in a more compact and unitary product than the prior methods, so that the product possesses more desirable characteristics for handling during consumption by the ultimate purchaser.

Other objects and advantages of the invention will be apparent from the following description, and from the accompanying drawings, in which similar characters of reference indicate similar parts throughout the several views.

Referring to the drawings, of which there are two sheets;

Fig. 6 is a view in perspective of the mold, wafers and ice cream in one of the subsequent steps of the formation of an improved ice cream sandwich;

Fig. 7 is a view in perspective of the final step in one of the other methods of making ice cream sandwiches; and Fig. 8 is a medial, vertical, sectional view of the sandwich mold.

Figure 1:
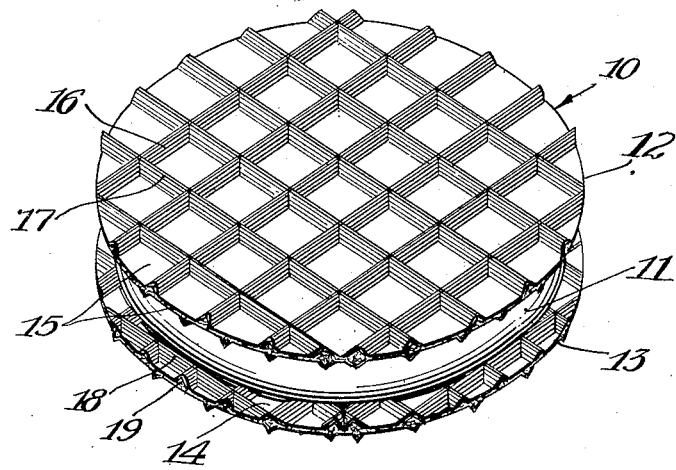
Fig. 1 is a view in perspective of the improved ice cream sandwich made according to the present methods.

The ice cream sandwich which is indicated in its entirety by the numeral 10 in Fig. 1, preferably consists of a filler 11 of ice cream and a pair of ice cream sandwich wafers 12 and 13. The wafers 12 and 13 may be identical in form, but are generally reversed in position for the purpose of locating the wafers with the side having the deepest recesses 14 adjacent the ice cream, but many of the advantages of the invention may be realized by using either side of the wafer adjacent the ice cream filler.

The wafers comprise baked, crisp and light food products which may be made out of the conventional batter containing milk, eggs, cane sugar and other selected ingredients and any of the conventional recipes for making wafers of this type may be employed. The wafers constructed according to the present invention may be crispier than the wafers of the prior art, thereby improving the palatable characteristics of the wafer without substantially diminishing its strength, due to the improved structure of the wafer described hereinafter.

The greater thinness of the parts of the present wafers gives a more even distribution of batter, which results in better heat distribution, more thorough baking and quicker baking, thereby permitting the use of more sugar, which is a desirable ingredient but one that is difficult to handle on account of the tendency toward stickiness or caramelization.

Each of the wafers may be identical in form, and the wafers are preferably formed with a body or web 15 of a minimum thickness as distinguished from the wafers of the prior art which were provided with a body of substantial thickness and in some cases with relatively small raised formations, but none of the wafers of the prior art were provided with formations capable of producing the results accomplished by the present wafers. The web or body 15 is made relatively thin by bringing the waffle plates very close together, but the strength of the wafer is provided by a multiplicity of ribs 16, 17, 18, 19, preferably upon both sides of the body 15.

The ribs 18 and 19 are preferably formed as a parallel series of ribs extending across the surface of the wafer and equally spaced from each other with the series of ribs 18 crossing and intersecting the series of ribs 19. The ribs 18 and 19 surround spaces or recesses 14 which are capable of receiving a part of the ice cream filler when the sandwich is made, and also receiving and retaining the melted part of the ice cream in the interior of the sandwich for a reasonable length of time.

The ribs 16—19 are preferably of substantially V-shape as shown, and the ribs are preferably relatively high as compared with the web or body 15 which is of minimum thickness, so that the major portion of the batter is utilized in the formation of the ribs which give the wafer most of its strength. This also renders the recesses 14 deeper and tends to maintain the wafers in their proper position with respect to the ice cream filler, and to each other, preventing the sliding of the wafer on the filler and also preventing the separation of the wafer from the ice cream filler by virtue of the suction which would be generated in the recesses 14 by pulling the wafer off the filler.

It should be noted that the ribs need not all be of the same size, depth or shape, depending upon the appearance desired, and other reinforcing formations may be used.

The ribs 16 and 17 on the other side of the wafer are preferably similar in form and arrangement to the ribs 18 and 19, but the ribs 16 and 17 are preferably spaced a greater distance apart from each other than the ribs 18 and 19, so that the ribs 16 and 17 on one side of the wafer do not register with the ribs 18 and 19 on the opposite side. This arrangement and spacing of the ribs, staggers the ribs on one side of the wafer with the ribs on the opposite side, increasing the bending strength of the finished wafer but not substantially increasing the shearing strength.

It will thus be observed that the improved wafer structure makes the wafers of sufficient strength so that they are not readily broken during the handling of the wafer or sandwich and in the eating of the sandwich it is found that the wafer is more crispy and capable of being bitten off with a portion of the filler without the possibility of breaking the wafer at other points or the possibility of the wafer crumbling in the hands of the consumer.

The present wafer also presents a substantial thickness which improves the appearance, depth and palatable characteristics of the sandwich, thereby producing a sandwich, the parts of which are more appropriately proportioned to each other. The present wafer structure is more economical of batter than the wafers of the prior art, on account of the relatively thin body or web and the use of the transverse ribs instead of the thicker bodies which were used in the prior wafers, and this saving in batter is accomplished without sacrificing the strength of the finished product, but on the contrary, the product may be made more crispy and provided with more desirable palatable characteristics when the present structure is used.

The present wafers may be made individually in baking molds provided for this purpose, with a mold for each wafer, but they are preferably made according to the improved method described hereinafter, for the following reasons. When a wafer is made individually the mold must either be filled to excess and the edges trimmed, or the operator must endeavor to estimate the amount of batter which will rise and spread to fill the mold. It is practically impossible to make perfectly shaped wafers in this way, because even the circular molds are not perfectly filled and the wafers are of irregular shape, with poorly defined boundaries and with thinner and irregular edges.

The preferred method of manufacture of the wafers comprises the use of large molds for forming sheets of baked material with the pattern or design and the mechanical structure of the wafers in multiple throughout the sheet. The pattern or reinforcing formations are preferably arranged symmetrically on the molds and sheet so that wafers of any shape or size may be made from the sheet, the wafers being identical in appearance, but other patterns may also be used.

The sheet having been baked first, it is placed upon a cutter having a multiplicity of knives of the desired shape for cutting out the wafers of predetermined form. The wafers may be made of any shape and knives having cutting edges arranged to cut out square wafers, may be used if desired, but in order to form wafers of preferred shape, the cutting machine is provided with a multiplicity of tubes having their upper edges beveled to form a sharp cutting edge at the inside of the wall of the tube and the tubes are placed as close together as possible.

The sheet of baked wafer material is placed on the tubes and pressed downward into the knives by a non-metallic board or sheet which forces the knives through the wafer material and the circular wafers drop downward through the tubes into a container.

The wafer cutting machine forms the subject of a separate application, and therefore will not be described in detail herein, but the present method of manufacture of wafers, including the cutting of the wafers after baking, is adapted to form a much more uniform and desirable product than the methods of the prior art.

The wafers are of uniformly circular or of other uniform shape, and since the present wafer is peculiarly adapted to be cut without crumbling on account of its improved structure, the wafers have relatively regular edges and the interior crisp structure of the wafer is exposed at the edge, presenting a better appearance and more palatable characteristics than the individually made wafer, the edge of which is baked to a crust and which cannot be made with any degree of regularity or uniformity.

The present wafers are preferably made round for the additional reason that a circular wafer may be used with any standard coating or depositing machine or hand-dipping, to place a layer or coating on the wafer, such as marshmallow, chocolate icing, caramel, nougat, candy, natural spread, bon bon cream or any other type of confection used in connection with depositing machines or with starch molds. The circular shape permits the spreading of the filler with substantial uniformity toward the boundary on all sides at the same time, and permits the formation of a substantially even layer from a centrally located deposit, whereas other shapes of wafers are not so adapted to be completely covered by uniform spreading of a centrally located deposit.

If desired, another wafer may be placed on top of the deposit, forming a baked confection similar to the ice cream sandwich described hereinafter, and in either case, the filler need not be pressed out completely to the edge, but may be left spaced from the outer edge so as to preclude the possibility of any of the filler falling out from between the wafers and soiling the clothing.

The relatively thin web and corrugations permit a better heat distribution in the operation of baking and because of the relative thinness of the parts, the wafers may be baked more thoroughly and more quickly with less cost and less labor. The present wafers have a lesser tendency to stick to the plates on account of the more thorough baking and a higher percentage of sugar may be used on account of the better heat distribution and quicker baking.

The circular shape has a peculiar appeal for children who endeavor to prolong the process of consumption and consequent enjoyment of the confection as long as possible by nibbling or licking at the wafers and filler.

The present ice cream sandwiches may be made of various shapes, and square or rectangular wafers may be provided for the purpose of forming sandwiches with a filler made from ice cream bricks, but the wafers and sandwiches are preferably made substantially circular as illustrated, for the following reasons.

The circular wafer and sandwich form a product of the largest diameter with a minimum amount of batter and filler. The circular shape in ice cream sandwiches is novel, and by comparison with a square sandwich of the same diameter, the present sandwich represents a saving in material, consisting in the amount which has been saved at each corner, when the wafers are formed individually.

When the wafers are formed in sheets and cut to shape, the portions between the circular boundaries are wasted but the saving in time and labor accomplished by this method, and the more perfectly shaped wafers more than justify the slight amount of waste involved in the cutting operation.

The margin of profit in articles of this type is generally rather low, and the profit is diminished by shrinkage of the ice cream, melting and other losses, so that any substantial saving in cream or filler is an important advantage.

The present sandwiches may be made according to a number of different methods, but they are preferably made by the use of the mold disclosed in Fig. 8, which is peculiarly adapted to be utilized for confining the filler between the wafers and forcing the filler into the recesses of the respective wafers to secure the ingredients of the sandwich together as firmly as is desirable in such a product.

The mold of Fig. 8 is preferably circular in shape since the preferred form of sandwich is circular and the mold may be very simply constructed by stamping out a sheet metal member 20 provided with a relatively flat bottom 21 and an annular or cylindrical wall 22. The height of the wall 22 depends on the thickness of the sandwich desired, and the thickness of the sandwich also depends somewhat on the manipulation of the mold, since the molded filler is thicker when the entire space in the mold is filled with ice cream.

The mold 20 is preferably provided with a centrally located pressed tubular formation 23 which is secured to a handle such as a wooden handle 24 having a reduced portion 25 which is frictionally secured in the tubular portion 23 by a pressed fit. The annular shoulder 26 on handle 24 determines the final position of the handle in the tubular formation 23.

The present mold is preferably provided with one or more apertures 27 of sufficient size to pass the thumb of the operator and the use of the apertures 27 will be described in detail hereinafter.

One of the most important advantages of the present mold is the elimination of the complicated structures of the prior art, which were provided with spring actuated ejecting devices and other relatively expensive structures, and the accomplishment of the same functions by a different manipulation and improved structure.

Figure 2:
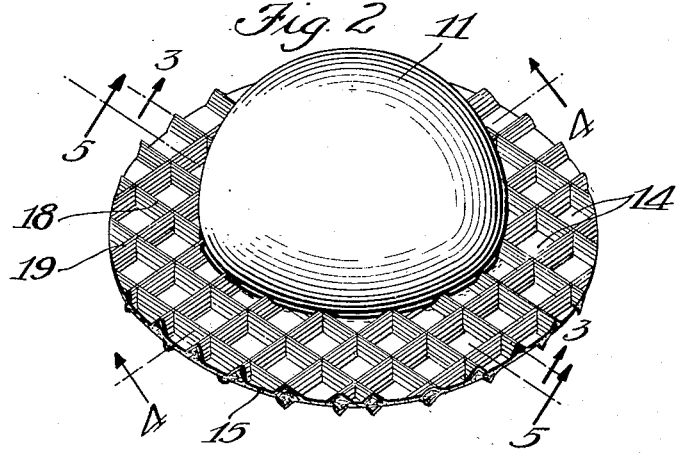
Fig. 2 is a view in perspective of the improved wafer with a dipperful of ice cream centrally located on the upper side of the wafer, as the ice cream is disposed in one of the preferred processes of making ice cream sandwiches.
Figure 3:
Fig. 3 is a sectional view of one of the wafers taken on the plane of the line 3—3 of Fig. 2.
Figure 4:
Fig. 4 is a similar sectional view on the plane of the line 4—4 of Fig. 2.
Figure 5:
Fig. 5 is a similar sectional view on the plane of the line 5—5 of Fig. 2.

The preferred method of making ice cream sandwiches is illustrated in Figs. 2 and 6, and is practiced as follows.

One of the wafers 13 is laid upon a relatively flat support, preferably with the side uppermost which has the smallest and deepest recesses. A substantially hemispherical body of ice cream, such as an ordinary portion or dipperful, is centrally located upon the wafer 13 as shown in Fig. 2, and a second wafer is placed on top of the ice cream as shown in Fig. 6. The body of ice cream is thus centrally located with respect to the two wafers, so that pressure exerted upon the wafers will tend to cause the ice cream to spread uniformly to the edges of the circular wafers, thereby forming a product of uniform thickness and characteristics.

The mold may then be placed on top of the upper wafer 12 with the annular flange 22 extending downward about the space between the two wafers and an even downward pressure may be exerted upon the parts of the upper wafer to force the ice cream into the recesses 14 and spread the ice cream uniformly toward the edges of the wafer. The use of the mold 20 accomplishes this result without possibility of breaking the wafers, since they are both uniformly supported upon a flat surface and the depending annular wall 22 tends to confine any excess of filler between the two wafers and gives an indication to the operator when the pressure operation is finished, rather than permit the operator to force the wafers too closely together. That is, when the annular flange 22 strikes the flat support or table, the sandwich should be completed, and the lifting of the mold will leave the sandwich on the table.

Another method of making the sandwiches may be practiced by holding the mold in one hand, such as the left hand and placing a wafer in the mold upon the bottom 21. The mold may then be filled with bulk ice cream, using a spoon or any other suitable utensil, and the excess ice cream may be leveled off with the top of the mold. Another wafer may be placed on top of the ice cream and pressed down into the ice cream, thereby finishing the sandwich, after which the sandwich may be conveniently ejected by the operator inserting his thumb in one of the apertures 27 as shown in Fig. 7. The ice cream sandwich may then be conveniently grasped by one edge and it will be evident that the simplified mold structure is fully as capable of producing new and useful results as any of the more expensive and complicated molds of the prior art, at a much lower cost. In order to permit the exertion of greater pressure, the mold may be provided with formations complementary to the surface of the sandwich wafer, if desired.

Another method of making ice cream sandwiches is the cutting off of layers of ice cream from a brick and placing the slice between two of the wafers of the type disclosed, or two squared wafers of similar structure, thereby forming an ice cream sandwich out of brick ice cream.

Another method comprises the filling of an appropriate mold with ice cream, placing the molded ice cream upon one wafer and covering it with another wafer, but the preferred method includes the use of sufficient pressure to force the ice cream into the recesses of the wafers and form a unitary product.

It will thus be observed that I have invented an improved ice cream sandwich wafer which is capable of use in the formation of improved ice cream sandwiches. The present wafers are economical in the use of batter and also in the use of filler such as ice cream, and the wafers may be made more crispy and more palatable without sacrificing the desirable characteristics of strength which should be present in an ice cream sandwich.

The sandwiches made according to the present invention with the approved wafers, are more sanitary than the sandwiches of the prior art, since leakage is prevented from the interior of the sandwich by the recesses and ribs which retain the melted ice cream and the present sandwiches are capable of more convenient handling and consumption than the sandwiches of the prior art on account of the characteristics of the improved wafers.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

In an ice cream sandwich, a pair of wafers, each having a web of minimum thickness and a plurality of transverse ribs formed on each side, each rib crossing and intersecting a plurality of other ribs forming deep recesses, said ribs being staggered with respect to each other and spaced differently upon the opposite sides of said wafer, and said wafers being circular in form, said ribs forming a multiplicity of deep recesses into which ice cream may be compressed, and a filler of ice cream pressed between said wafers and into said recesses to prevent the separation of the wafers, said ribs also being adapted to prevent leakage of melted ice cream from the interior of said sandwich and to prevent sliding of the wafers on said ice cream filler.

SOL S. LEAF.